United States Patent [19]

Topper

[11] Patent Number: 6,002,434
[45] Date of Patent: Dec. 14, 1999

[54] REGISTRATION CORRECTION WAVEFORM DETERMINATION METHOD AND SYSTEM FOR A TELEVISION CAMERA

[75] Inventor: Robert J. Topper, Hatboro, Pa.

[73] Assignee: Matsushita Electric Industrial Co., Ltd., Osaka, Japan

[21] Appl. No.: 08/783,214

[22] Filed: Jan. 14, 1997

[51] Int. Cl.[6] .................................................. H04N 9/093
[52] U.S. Cl. ........................................ 348/263; 348/252
[58] Field of Search .................................. 348/252, 253, 348/262, 263, 264, 265, 26, 28, 29, 30, 650, 702, 70, 269, 248, 576, 745, 190; 382/199, 294, 274, 167; 358/504, 516; H04N 9/093

[56] References Cited

U.S. PATENT DOCUMENTS

| | | |
|---|---|---|
| 4,133,003 | 1/1979 | Flory et al. . |
| 4,316,257 | 2/1982 | Del Medico et al. . |
| 4,500,916 | 2/1985 | Nabulsi . |
| 5,057,911 | 10/1991 | Stec et al. . |
| 5,157,481 | 10/1992 | Kashimura et al. . |
| 5,353,056 | 10/1994 | Westerink et al. . |
| 5,475,428 | 12/1995 | Hintz et al. ........................ 348/263 |
| 5,485,203 | 1/1996 | Nakamura et al. .................. 348/263 |

OTHER PUBLICATIONS

Crout, Prescott D., "A Short Method for Evaluating Determinants and Solving Systems of Linear Equations With Real or Complex Coefficients", AIEE Transactions, vol. 60, (1941), pp. 1235–1240.

*Primary Examiner*—Tuan Ho
*Attorney, Agent, or Firm*—Ratner & Prestia

[57] ABSTRACT

Horizontal and vertical registration errors in a color television camera are automatically error corrected by detecting registration errors in live scenes. Each error is associated with the preselected region of the raster in which it was detected. The errors are separately collected for each region. An error waveform is generated from collected error values. The past history of registration errors is also used. A correction waveform is generated to correct the registration error by minimizing the error waveform. This automatic registration system is microprocessor controlled.

12 Claims, 3 Drawing Sheets

REGISTRATION CORRECTION WAVEFORM DETERMINATION METHOD AND SYSTEM FOR A TELEVISION CAMERA

FIELD OF THE INVENTION

The present invention relates to color television cameras in general, and specifically to automatic correction of registration errors. In particular, the present invention describes a method and system for using waveforms to correct camera registration errors.

BACKGROUND OF THE INVENTION

A raster registration system for a television camera is provided in which an error waveform is utilized to develop a correction waveform for reducing the misregistration of the rasters.

Color television cameras generally include two or more image pickup devices (image forming tubes or charge coupled device (CCD) arrays) for developing separate video signals representative of component colors of a scene being viewed by the camera. Accurate registration or synchronization of the video signals produced by a color television camera is important so that the signals simultaneously convey information related to the same portion of an image.

Camera registration has traditionally been accomplished by adding linear combinations of predetermined waveforms to best approximate the registration error of the camera. The weighting coefficients for these waveforms are entered by a technician who dials in varying amounts of the different waveforms while the camera is aimed at a test chart. These waveforms are then used to modify the deflection signals applied to the imaging devices to bring the signals provided by the various devices into alignment.

This manual approach and many automatic approaches typically require the use of calibration charts to construct the data set used for on-air correction. Automatic registration systems have been developed which automatically converge on the optimal set of adjustments while the camera is aimed at the test chart. This typically involves developing an output video waveform from each image pickup device by capturing images of the test chart and comparing the phase or time displacement of the resultant video waveforms with those produced by the other image pickup devices.

In other words, many known automatic registration systems require the use of a special registration setup chart to enable a predetermined pattern of figures to be imaged onto the various pickup devices of the camera, and registration is performed as part of the normal camera setup procedure prior to going on-air. As the pattern is scanned, transitions in the video signals associated with the edges of the figures are compared, and correction signals are applied to the scan circuits of the camera so that corresponding transitions in the different video signals occur simultaneously. The correct operation of the many systems is dependent upon the existence of video signal transitions in predetermined regions of the raster, and, in some cases, upon transitions between full black and full white levels. Over a period of time, however, registration can change, because of changes in temperature or voltage, or because of drift in electrical circuits, and the camera must be taken off-air to readjust the registration.

If zoom, focus and iris adjustments are taken into account, as they must be for lens chromatic aberration correction, an extremely tedious and time-consuming setup procedure is necessary to build the registration data set for all the possible combinations of lens settings. Thus, for this application, a system which builds its error data set from typical scene material is desirable.

Another approach which uses on-air measurement divides the raster into many zones, and then stores, in memory, the errors for each zone as they are detected. The correction waveforms are updated as data becomes available. While this method solves the problem of setting up the camera, it requires a very large memory to store all of the errors in each of the zones for all of the various zoom, focus, and iris positions. An automatic registration correction system requiring a large memory for storing all of the errors in each of the zones is described in U.S. Pat. No. 4,500,916, entitled "Automatic On-Air Registration System and Method for Color TV Camera", which is hereby incorporated by reference for its teachings on automatic correction of registration errors.

Although there are automatic registration system that operate on-air to correct registration errors, those systems have limited capability or other disadvantages which limit their usefulness. Examples include U.S. Pat. No. 4,133,003, entitled "Raster Registration System for a Television Camera", and U.S. Pat. No. 4,316,257, entitled "Dynamic Modification of Spatial Distortion Correction Capabilities of Scintillation Camera", which are hereby incorporated by reference for their teachings on correction of camera registration errors. Thus, it is desirable to provide improved systems and methods that are capable of operating on-air with actual scenes to automatically detect and correct registration errors in signals produced by color television cameras.

SUMMARY OF THE INVENTION

This invention provides a system and a method for continually and automatically correcting registration errors in a color television camera while avoiding the above and other disadvantages of known correction methods and systems. The invention is capable of detecting registration errors using actual televised scenes, and can correct errors while the camera is on-air.

In accordance with the present invention, an exemplary system and method are provided for waveform correction of registration/chromatic aberration errors. Predetermined waveforms, weighted by weighting coefficients, are combined and can be any shape the designer deems appropriate to generate an error correcting waveform for the nature of the error to be corrected. Only the predetermined waveforms and the weighting coefficients of these predetermined waveforms are stored. The detected errors, and subsequent error correction waveform, are not stored, thereby significantly reducing the memory requirements of the system.

In an exemplary embodiment of the present invention, an automatic registration correction system for a color television camera that raster scans a scene and produces video signals that represent different component colors thereof is provided. The automatic registration correction system includes an edge detector which receives the video signals and generates error signals responsive to the video signals, a microprocessor which receives and analyzes the error signals and generates a correction waveform and weighting coefficients responsive to the error signals, a memory for storing the correction waveform coefficients, and an interpolator which applies the correction waveform to the scene to correct the registration.

In accordance with another exemplary aspect of the present invention, video signals representative of different component colors of a scene being raster scanned by a color television camera are sampled at different points in the raster to form an error waveform. The error waveform is provided to a microprocessor which generates the correction waveform.

DESCRIPTION OF PREFERRED EMBODIMENTS AND BEST MODE

Figure 1:
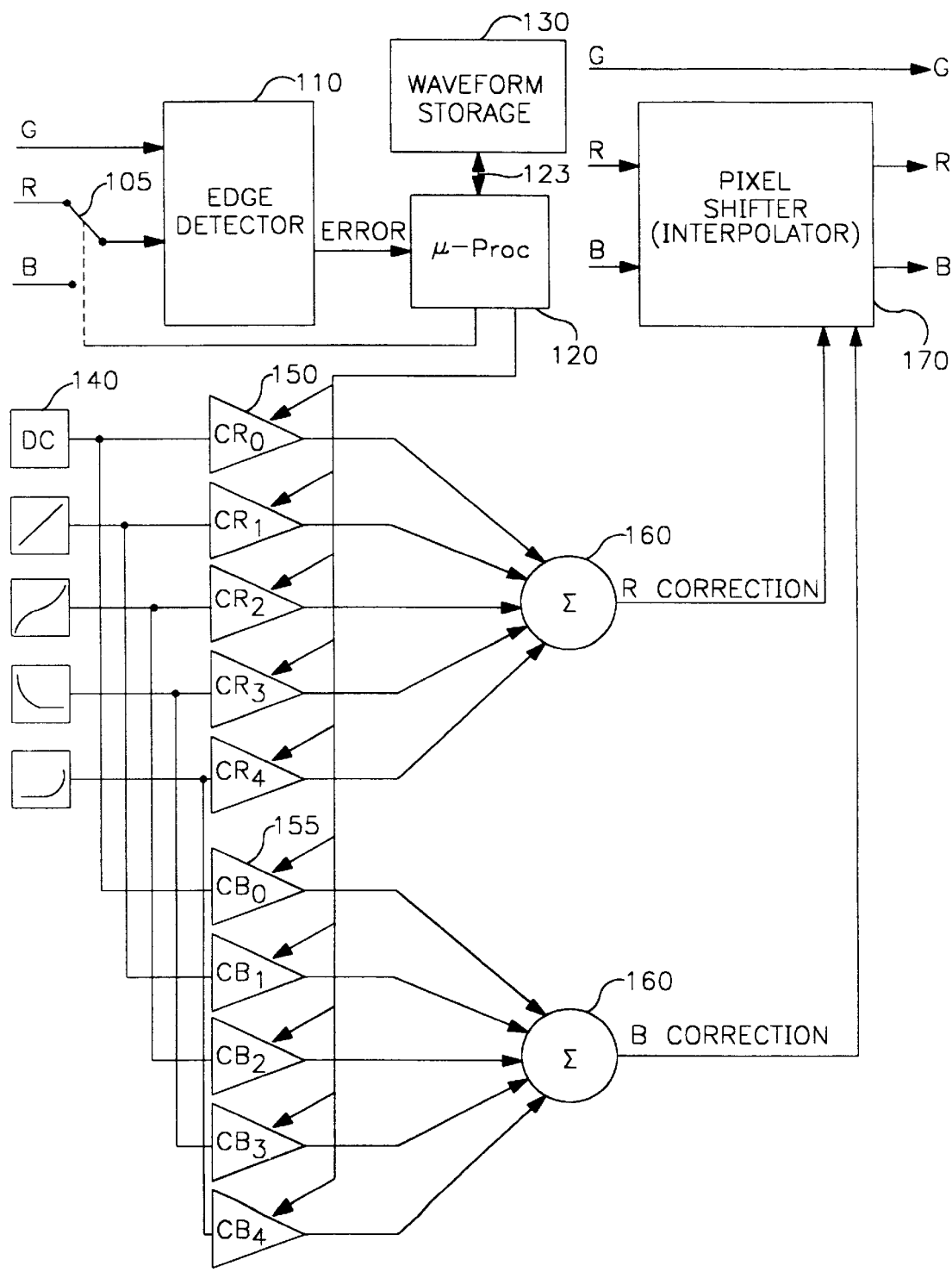
FIG. 1 is a block diagram of an exemplary registration/chromatic aberration correction system in accordance with the present invention.

The invention will be described in connection with a television camera having three image sensors (either imaging tubes or charge coupled devices (CCD's)), since this type of camera is one of the most widely used. However, as will be apparent from the description that follows, the invention is also applicable to other types of color television cameras, for example, cameras having a single image sensor tiled with color filters, and is also applicable to other types of systems where it is desired to synchronize scanning rasters and the like.

In a typical three sensor color television camera, each image pickup device scans an image of a scene being viewed by the camera and generates a corresponding component color video signal. The video signals from the image sensors correspond respectively to red (R), blue (B) and green (G) component colors of the scene being viewed in the image. The component color video signals R, G and B are waveforms representative of the intensity of the three color-related rasters. Values of the signals at the same instant are assumed to represent the same position in the image. Each camera tube has its own horizontal and vertical scanning circuits which control the raster scan of the tube. Registration errors occur in tube-based cameras if the three rasters are not perfectly synchronized spatially in both the horizontal and vertical directions. Misregistration in both tubes and solid-state imaging devices may be caused, for example, by errors in centering or size or by non-linearities. If the three image pickup device rasters are not identical in size nor in complete registration with each other, the signal waveforms from each raster will differ in position/time relative to each other. In addition, registration errors may be caused by chromatic aberration in the lens system used to capture images of the scene. These errors typically occur near the edge of the image and are caused by the lens deflecting light at different wavelengths by different amounts. In the exemplary embodiment of the invention, a shifter/interpolator 170 is used to change the position of picture elements (pixels) in one color signal to match the position of similar pixels in another signal. The amount by which the pixels of a signal are to be shifted is specified in a correction waveform that is applied to the shifter/interpolator 170.

A key feature of the present invention is the way in which the correction data comprising the composite correction waveform is stored and manipulated. For example, assume that the raster is divided into thirty horizontal zones and eight vertical zones. The composite correction waveform describes the horizontal shifting and interpolation needed to match one color signal to another. In the exemplary embodiment of the invention, this waveform is a linear combination of weighted predetermined waveforms. Initially, the correction waveform is set to zero. As error measurements (i.e., misaligned edges) are obtained for the zones across the raster, the best linear combination of the stored predetermined waveforms is determined by combining weighted versions of the waveforms in each horizontal zone and performing a least-squares, best-fit algorithm on the thirty point data set to determine the best weighting factors. These weighted combined waveforms produce a correction waveform which when combined with the error waveform produces a minimum resulting waveform.

The thirty data points used in the best-fit algorithms in this exemplary embodiment are obtained in the following manner. As two color images are scanned through a particular zone, image edges are located in the scanned signals and compared. Any differences in the time at which an edge occurs in a signal compared to when it occurs in the other signal may represent an alignment error. The error is measured as the sign and magnitude of the time differences between the reference signal and the signal to be aligned. When an error measurement is obtained for a particular zone, the error measurement value corresponding to that zone is used directly as the data point for that zone. For the zones in which no error measurement is obtained, the error measurement value corresponding to that zone is taken from the most recent composite correction waveform, the weighting coefficients of which have been stored in a memory. For example, if data is newly available for twenty of the thirty zones, this newly available data is used along with the preexisting stored data for the remaining ten zones in which no new error measurement data has been obtained (e.g., no edges are detected in these zones). The preexisting stored data for the remaining ten zones is determined from the waveform that is generated by the stored composite correction waveform coefficients. Based on this newly available data and the preexisting stored data, a new composite correction waveform, with new weighting coefficients, is generated. After the new composite waveform weighting coefficients are computed and stored, all error measurements are discarded. While this method does not yield perfect correction immediately, an accurate correction waveform is converged upon after several iterations on scenes having a reasonable amount of edge information.

An advantage of storing the information in this way is that neither the errors nor the correction waveform for each zone need to be stored, thereby reducing storage requirements by more than eighty percent, in this example. While only horizontal corrections are considered in this exemplary embodiment, vertical zones are defined because horizontal correction varies as a function of vertical position.

FIG. 1 is a block diagram of an exemplary registration/chromatic aberration correction system in accordance with the present invention. The camera image is divided horizontally and vertically into a number of zones; e.g., thirty horizontal and eight vertical zones.

For both horizontal and vertical registration, the G video signal is used as a reference to which the R and B video signals are compared, and appropriate correction waveforms are applied to a pixel-shifter or an interpolator to correct registration errors.

As shown in FIG. 1, the G horizontal video signal, which is used as the reference video signal, and either the R horizontal video signal or the B horizontal video signal are coupled to the input terminals of a horizontal and vertical error detection unit or edge detector 110. The edge detector 110, which may be a conventional edge detector, such as that described in U.S. Pat. No. 4,133,003, entitled "Raster Registration System for a Television Camera", which is hereby incorporated by reference for its teachings on edge detectors, receives either the R video signal or the B video signal responsive to the position of a switch 105 controlled by a control microprocessor 120. The output terminal of the edge detector 110 is coupled to the microprocessor 120. The microprocessor 120 is coupled to the switch 105, a waveform storage random-access memory (RAM) 130, and two banks of gain stages 150 and 155. Waveform generators 140 are also coupled to the gain stages 150 and 155. Each bank of gain stages 150 and 155 is coupled to a respective adder 160. The adders 16, in turn, are coupled to a pixel shifter or interpolator 170.

The edge detector 110 determines the amount and direction of the misregistration of each raster-related signal by utilizing one raster-related signal as a reference, for example, as stated above, the G video signal. Therefore, the amount and direction of the misregistration of the R raster signal relative to the G raster signal and the B raster signal relative to the same G raster signal yields two time multiplexed control signals or error waveforms indicative of the displacement of corresponding image edges detected in the R and B rasters, respectively, relative to a similar image edge detected in the G raster. The control microprocessor 120 collects the error signals provided by the edge detector 110, analyzes the collected error signals, and generates appropriate weighting values for the gain stages 150 and 155 to produce the correction waveform. The predetermined waveforms 140 are multiplied by the weighting values at the gain stages 150 and 155 and summed at adders 160 to provide an appropriate composite correction signal or waveform to a pixel shifter/interpolator 170. The first bank of gain stages 150 is for the red signal, and the other bank of gain stages 155 is for the blue signal. The interpolator modifies the timing of the red and blue signals responsive to the magnitude of the correction signals to produce red and blue signals which are aligned in time with the green signal.

Figure 2:
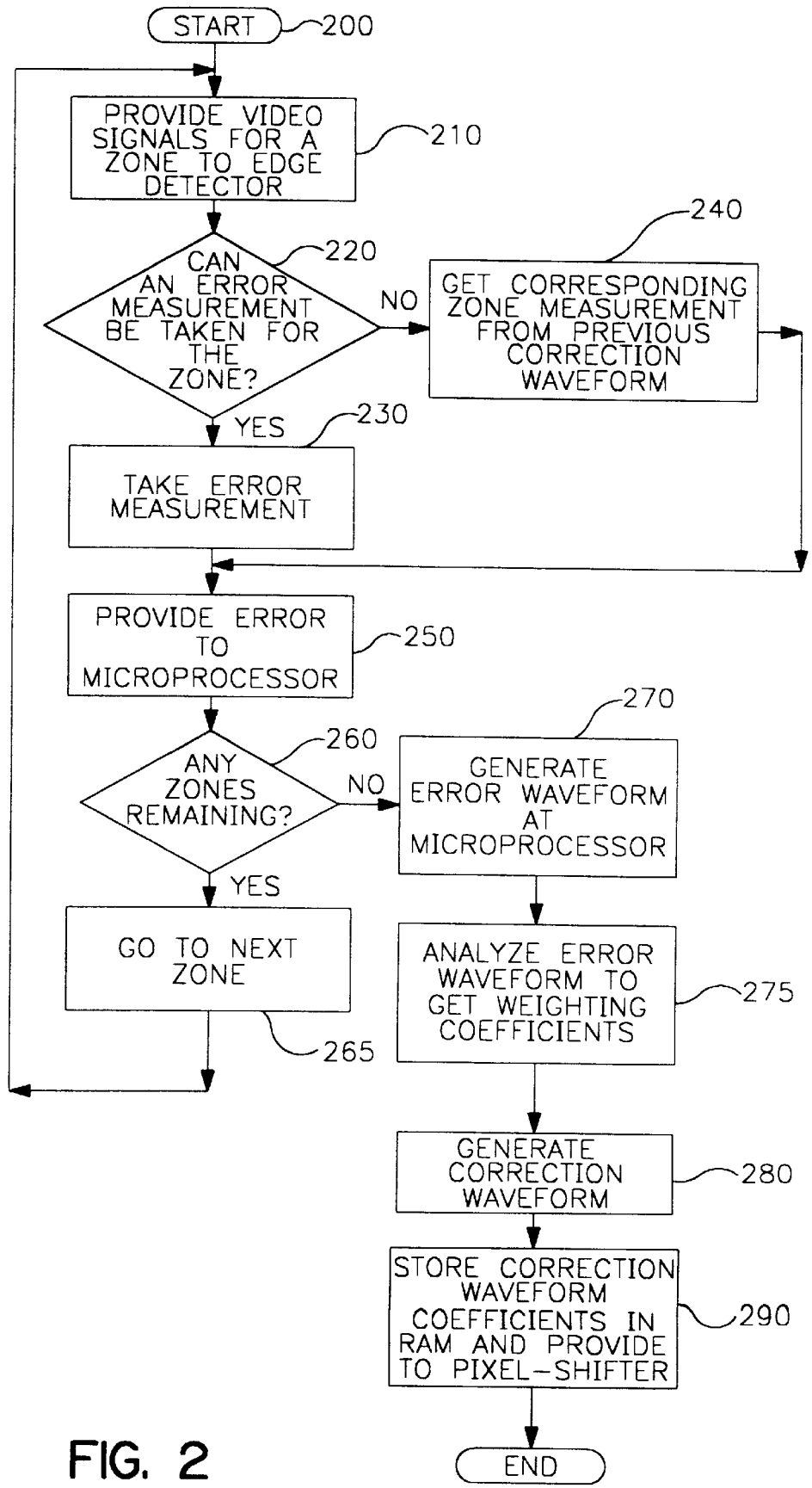
FIG. 2 is a flow chart illustrating an exemplary method of detecting and correcting registration errors in accordance with the present invention.

The flow chart of FIG. 2 illustrates in detail a preferred method of detecting and correcting registration errors in one vertical zone (30 horizontal zones) of the image. The flow chart represents the sequence of operations which may be performed by the microprocessor, and can be translated directly into a program for the microprocessor.

Beginning at the top of FIG. 2 with "Start" block 200, the video signals of a first zone are provided to an edge detector at step 210. At step 220, the edge detector determines if an error measurement can be made based on the provided signals. If an error measurement can be taken, it is done at step 230. If an error measurement cannot be taken, the corresponding zone measurement from the previously stored composite correction waveform coefficients (i.e., the weighting coefficients) for this zone are obtained at step 240 and an error is calculated based on the composite waveform generated from the coefficients. The error measurement is then provided to the microprocessor at step 250. If any horizontal zones remain to be analyzed in the vertical zone, then steps 210–250 are repeated at step 260 and 265. If an error measurement has been taken for each zone, the microprocessor generates an error waveform at step 270. The error waveform is analyzed at step 275 to obtain weighting coefficients, which are used to generate the correction waveform at step 280. The weighting coefficients for the correction waveform are stored in a memory at step 285 and the waveform and is provided to a pixel-shifter interpolator to correct the registration errors at step 290.

The correction waveform is generated by building a system of equations as follows:

The composite correction waveform is an estimate of the actual error and is written as shown in equation (1):

$$\hat{y}(x) = c_0 + c_1 f_1(x) + c_2 f_2(x) + c_3 f_3(x) + c_4 f_4(x) \tag{1}$$

where $f_i(x)$ are the predetermined basis functions or waveforms (shown in waveform generators 140) stored in a memory (RAM or ROM) and $c_i$ are the weighting coefficients of these predetermined waveforms.

The approximation error $\epsilon$ is then determined according to equation (2):

$$\epsilon = y(x) - \hat{y}(x) = y(x) - [c_0 + c_1 f_1(x) + c_2 f_2(x) + c_3 f_3(x) + c_4 f_4(x)] \tag{2}$$

Minimizing the mean-square error yields equation (3):

$$\min \epsilon = \min \Sigma(y(x) - [\,])^2 \tag{3}$$

where [ ] is above bracketed expression.

Setting partial derivatives equal to zero, as shown in equation (4):

$$\frac{\partial}{\partial c_0} \epsilon \Rightarrow \sum_i [\,] = \sum_i y(x_i) \tag{4}$$

$$\frac{\partial}{\partial c_1} \epsilon \Rightarrow \sum_i f_1(x_i)[\,] = \sum_i y(x_i) f_1(x_i)$$

$$\frac{\partial}{\partial c_2} \epsilon \Rightarrow \sum_i f_2(x_i)[\,] = \sum_i y(x_i) f_2(x_i)$$

etc.

which leads to the system of equations (5):

$$A\bar{c} = \bar{b} \tag{5}$$

where $$A = \begin{bmatrix} \sum_i 1 & \sum_i f_1(x_i) & \sum_i f_2(x_i) & \sum_i f_3(x_i) & \sum_i f_4(x_i) \\ \sum_i f_1(x_i) & \sum_i f_1^2(x_i) & \sum_i f_1(x_i)f_2(x_i) & \sum_i f_1(x_i)f_3(x_i) & \sum_i f_1(x_i)f_4(x_i) \\ \sum_i f_2(x_i) & \sum_i f_2(x_i)f_1(x_i) & \sum_i f_2^2(x_i) & \sum_i f_2(x_i)f_3(x_i) & \sum_i f_2(x_i)f_4(x_i) \\ \sum_i f_3(x_i) & \sum_i f_3(x_i)f_1(x_i) & \sum_i f_3(x_i)f_2(x_i) & \sum_i f_3^2(x_i) & \sum_i f_3(x_i)f_4(x_i) \\ \sum_i f_4(x_i) & \sum_i f_4(x_i)f_1(x_i) & \sum_i f_4(x_i)f_2(x_i) & \sum_i f_4(x_i)f_3(x_i) & \sum_i f_4^2(x_i) \end{bmatrix}$$

and $$\overline{b} = \begin{bmatrix} \sum_i y(x_i) \\ \sum_i f_1(x_i)y(x_i) \\ \sum_i f_2(x_i)y(x_i) \\ \sum_i f_3(x_i)y(x_i) \\ \sum_i f_4(x_i)y(x_i) \end{bmatrix}$$

The system of equations is solved for the weighting coefficients $c_i$ using a conventional equation solver. The correction waveform is $-\hat{y}(x)$. The weighting coefficients $c_i$ for the R signal are then provided to gain stages 150 (the weighting coefficients for the B signal are provided to gain stages 155) which are multiplied by the predetermined waveforms generated by the waveform generators 140, as shown in FIG. 1. The weighted predetermined waveforms are then added at an adder 160 to produce a composite correction waveform. The composite correction waveforms provided by the adders 160 in FIG. 1 are applied to the pixel-shifter/interpolator 170 which shifts and interpolates the incoming R signal by the amount prescribed by the correction waveform, $-\hat{y}(x)$, thereby producing a registered R/G image. The weighting coefficients of the composite correction waveform are provided to a waveform storage RAM 130. In another embodiment (not shown), the microprocessor 120 is connected to the pixel-shifter 170 and provides the output signal of the adders 160 (the composite correction waveform) to the pixel-shifter 170 for interpolating the incoming R signal by the amount prescribed by the correction waveform, thereby producing a registered RIG image.

The entire process described above with respect to the R signal may be performed for the B signal on either a field-by-field basis, a line-by-line basis alternating with the R signal processing, or in parallel with the R signal processing. A correction waveform representing the registration error between the B/G signal is sent to the pixel-shifter 170 to produce a registered B/G image. Thus, in one field, for example, the edge differences between R and G and between B and G are measured for eight vertical zones. If the process is performed for the R signal and the B signal in parallel, then an additional edge detector (not shown) may be required. The microprocessor 120 calculates two different sets of correction waveforms. The exemplary correction waveforms complement the error waveforms. In other words, the sums of the error waveforms and the correction waveforms are minimized. The interpolator 170 uses the correction waveforms to perform the corrections and to appropriately shift the waveforms. A sampled-data continuous composite correction waveform is provided to the shifter/interpolator 170. The shifter/interpolator 170 may use a conventional shifter to perform a whole pixel corrections and an interpolator such as that described in U.S. Pat. No. 5,057,911, entitled "System and Method for Conversion of Digital Video Signals", which is hereby incorporated by reference for its teachings on image pixel interpolation, to perform sub-pixel corrections.

The flow chart shown in FIG. 2 describes the correction operation for the first row of zones only. When the scanning reaches beyond the first zone vertically, a different set of weighting coefficients, defined for the zones of the new row, is used. Curves are then generated for both the red and blue images for the remaining seven rows of horizontal zones to complete the correction data set for this particular zoom, focus and iris setting. The process continues for as long as these settings remain fixed, thereby increasing the accuracy of the composite correction waveforms.

When any of the lens settings change, the most recent weighting coefficients of the correction waveform for that setting are retrieved from the waveform storage RAM 130 and used by the system. Edge detection and correction then proceeds as described previously to dynamically generate new waveforms for the new optical settings. This greatly reduces correction storage requirement since only 80 values (10 coefficients×8 vertical zones) need to be stored for each optical setting. System refinements can be added to make the on-air corrections less noticeable and to make the system more robust. For example, as the edge detection history for the zones increases, the weighting of new data measurements may be decreased to reduce the effect of erroneous measurements and to make the effect of correction updates less noticeable in the on-air image.

All of the current predetermined waveforms 140 and focuses are stored in a memory such as the waveform storage RAM 130 or a ROM (not shown). The weighting coefficients are also stored in the RAM 130. The exemplary RAM 130 is a nonvolatile memory. Therefore, when the camera is turned off, the settings are not lost. In FIG. 1, the arrow 123 from the microprocessor 120 to the waveform coefficient storage RAM 130 is two-way so that new weighting coefficients of the predetermined waveforms can be saved in memory. The RAM 130 stores a set of waveform coefficients which covers the whole screen. Every time new edge information is obtained for a particular sector, the microprocessor 120 updates that particular portion with one of the waveforms. It uses the data points as new inputs and then recalculates the entire correction waveform. The predetermined waveforms stored in memory do not change. Only the weighting coefficients change so that the resulting composite correction waveform changes on the fly. The predetermined waveforms (shown in waveform generators 140) are fixed in memory.

The fitting algorithm that is used in the exemplary embodiment solves for the weighting coefficients to be applied to the stored basis functions or predetermined waveforms by minimizing the mean-square error of the correction. The algorithm used to solve the set of linear equations is based on that described by P. D. Crout in "A Short Method for Evaluating Determinants and Solving Systems of Linear Equations with Real or Complex Coefficients", Trans. AIEE, Vol. 60 (1941), pp. 1235–1240. However, any means of solving the set of equations may be employed.

Advantages of this technique for correcting registration errors include the ability to use less expensive lenses, thereby lowering the overall cost of the camera.

It is also possible to correct the registration both horizontally and vertically by using separate vertical and horizontal edge detectors. Vertical registration errors may be detected in the same way as that just described for horizontal registration errors using a system similar to that illustrated in FIG. 1.

Figure 3:
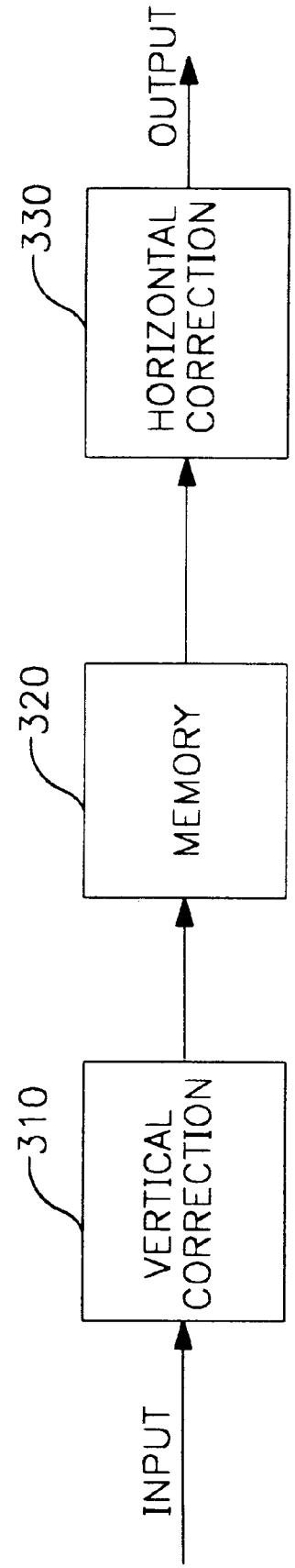
FIG. 3 is a block diagram of an exemplary system that detects and corrects vertical and horizontal registration/chromatic aberrations in accordance with the present invention.

FIG. 3 is a block diagram of a system that detects and corrects vertical and horizontal registration errors in a three sensor color television camera. As shown in FIG. 3, the system may comprise a vertical registration error detection unit 310 and a horizontal registration error detection unit 330, as described above with respect to FIGS. 1 and 2. The vertical registration error detection unit 310 and the horizontal registration error detection unit 330 are separate and function sequentially. For vertical registration error detection, the raster is divided into, for example, twenty-three horizontal zones and twelve vertical zones. For horizontal registration error detection, the raster is divided into, for example, thirty horizontal zones and eight vertical zones. A memory 320 is provided to store the vertical correction weighting coefficients. After the horizontal correction is performed, the weighting coefficients are provided as output to a shifter/interpolator to correct the registration.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed is:

1. An automatic registration correction system for a color television camera that raster scans a scene and produces video signals that represent different component colors thereof, comprising:

edge detection means for receiving the video signals and for generating a plurality of error signals representing timing differences between corresponding components of the video signals;

processing means for receiving and analyzing the error signals and generating a composite correction waveform, by applying a plurality of weighting coefficients to a respective plurality of predetermined waveforms, responsive to the error signals and combining the weighted waveforms;

memory means for storing the weighting coefficients; and interpolator means for applying the correction waveform to the scene to correct the registration.

2. An automatic registration correction system according to claim 1, wherein the processing means includes means for generating an error waveform from the plurality of error signals and for generating the plurality of weighting coefficients responsive to the error waveform by adjusting the weighting coefficients to minimize a combination of the error waveform and the correction waveform.

3. An automatic registration correction system according to claim 2, further comprising:

waveform generators to generate the predetermined waveforms;

gain stages to apply the weighting coefficients to the predetermined waveforms; and adders to add the weighted predetermined waveforms together to generate the correction waveform.

4. An automatic registration correction system according to claim 3, wherein the memory means stores the predetermined waveforms.

5. An automatic registration correction system according to claim 2, wherein the means for generating the plurality of weighting coefficients includes means for solving a set of equations which are used to generate the correction waveform to minimize the combination of the correction waveform and the error waveform.

6. A method of automatically correcting registration errors in a color television camera, comprising the steps of:

raster scanning a scene to produce a raster and a plurality of video signals, each video signal representative of a different component color of the scene;

dividing the raster into a predetermined number of regions;

sampling a first component color video signal and a second component color video signal at a plurality of points in each region;

comparing the first component color video signal and the second component color video signal at each point to generate a plurality of error signals for each region;

producing an error waveform responsive to the error signals for each region;

generating a correction waveform responsive to the error waveform; and interpolating one of the first component color video signal and the second component color video signal responsive to the correction waveform to correct the registration errors.

7. A method of automatically correcting registration errors in a color television camera according to claim 6, wherein the correction waveform includes weighting coefficients, the method further comprising the step of storing the weighting coefficients in a memory means.

8. A method of automatically correcting registration errors in a color television camera according to claim 6, wherein the predetermined number of regions comprises a predetermined number of horizontal zones and a predetermined number of vertical zones.

9. A method of automatically correcting registration errors in a color television camera according to claim 6, wherein the step of comparing includes a step of measuring a time interval between signal values corresponding to an edge in the first component color video signal and signal values corresponding to the edge in the second component color video signal.

10. A method of automatically correcting registration errors in a color television camera according to claim 6, wherein the step of generating the correction waveform includes the step of analyzing the error waveform using a microprocessor.

11. A method of automatically correcting registration errors in a color television camera according to claim 10, wherein the step of analyzing the error waveform includes the step of solving a system of equations which are used to generate the correction waveform to minimize an additive combination of the correction waveform and the error waveform.

12. A method of automatically correcting registration errors in a color television camera according to claim 6, wherein the step of comparing the first component color video signal and the second component color video signal includes the step of retrieving previously generated weighting coefficients to generate the plurality of error signals for each region.

* * * * *